US012627752B2

(12) United States Patent
Kung et al.

(10) Patent No.: US 12,627,752 B2
(45) Date of Patent: May 12, 2026

(54) FOLDABLE DEVICE WITH HINGE-INTEGRATED ANTENNA

(71) Applicant: QUALCOMM Incorporated, San Diego, CA (US)

(72) Inventors: Yi-Hsiang Kung, Taipei (TW); Cheng-Fan Wei, New Taipei City (TW); Chao-Kuei Chang, Taipei City (TW)

(73) Assignee: QUALCOMM Incorporated, San Diego, CA (US)

( * ) Notice: Subject to any disclaimer, the term of this patent is extended or adjusted under 35 U.S.C. 154(b) by 420 days.

(21) Appl. No.: 18/470,739

(22) Filed: Sep. 20, 2023

(65) Prior Publication Data

US 2025/0097329 A1 Mar. 20, 2025

(51) Int. Cl.
*H04M 1/02* (2006.01)
*H04B 1/16* (2006.01)
(52) U.S. Cl.
CPC ........ *H04M 1/0218* (2013.01); *H04B 1/1615* (2013.01)
(58) Field of Classification Search
CPC .......................... H04M 1/0218; H04M 1/0214; H04B 1/1615; H01Q 1/243
See application file for complete search history.

(56) References Cited

U.S. PATENT DOCUMENTS 9,831,928 B2 * 11/2017 Kim .......................... H01Q 1/42
11,115,511 B1 * 9/2021 Ghaemi ................ H04B 7/0602

12,068,528 B2 * 8/2024 Harper ................... H01Q 1/241
12,167,531 B2 * 12/2024 Kang ........................ H05K 1/14
2005/0239519 A1 * 10/2005 Saitou .................... H01Q 1/243
455/575.1
2006/0071863 A1 4/2006 Lindell
(Continued)

FOREIGN PATENT DOCUMENTS

EP 3926935 A1 12/2021
EP 3855711 B1 8/2023
(Continued)

OTHER PUBLICATIONS

International Search Report and Written Opinion—PCT/US2024/043870—ISA/EPO—Dec. 9, 2024.

*Primary Examiner* — Lewis G West
(74) *Attorney, Agent, or Firm* — Smith Tempel Blaha LLC/Qualcomm Incorporated

(57) ABSTRACT

A method of configuring a signal transducer of a foldable UE includes: providing a first panel comprising a first conductor configured to provide a first portion of the signal transducer; providing a second panel comprising a second conductor configured to provide a second portion of the signal transducer; providing a hinge connected to the first panel and the second panel and configured to allow the first panel to rotate relative to the second panel about a pivot axis of the hinge, the hinge comprising a third conductor configured to provide a third portion of the signal transducer, the third conductor electrically coupling the first conductor to the second conductor; providing a fourth conductor that is physically separate from the first conductor, the second conductor, and the third conductor; and selectively causing the fourth conductor to provide a fourth portion of the signal transducer.

30 Claims, 11 Drawing Sheets

(56) References Cited

U.S. PATENT DOCUMENTS

| | | | | |
|---|---|---|---|---|
| 2007/0021159 A1* | 1/2007 | Kaneoya | H01Q 9/42 | |
| | | | 455/575.3 | |
| 2007/0194997 A1* | 8/2007 | Nakanishi | H01Q 1/243 | |
| | | | 343/702 | |
| 2009/0128424 A1* | 5/2009 | Suzuki | H01Q 9/30 | |
| | | | 343/702 | |
| 2010/0222111 A1* | 9/2010 | Suetake | H01Q 1/243 | |
| | | | 455/566 | |
| 2011/0012797 A1* | 1/2011 | Tani | H01Q 9/40 | |
| | | | 343/702 | |
| 2012/0062429 A1* | 3/2012 | Uno | H01Q 1/243 | |
| | | | 343/702 | |
| 2020/0287274 A1 | 9/2020 | Zhang | | |
| 2021/0143551 A1* | 5/2021 | Zekios | H01Q 1/08 | |
| 2021/0377372 A1* | 12/2021 | Jung | H04M 1/0216 | |
| 2023/0081739 A1* | 3/2023 | Lin | H01Q 5/40 | |
| | | | 343/702 | |
| 2023/0086173 A1 | 3/2023 | Lee et al. | | |
| 2023/0327324 A1* | 10/2023 | Seol | G06F 1/1681 | |
| | | | 455/566 | |
| 2024/0047858 A1* | 2/2024 | Cho | H04M 1/0214 | |
| 2024/0097324 A1* | 3/2024 | Xu | H01Q 5/35 | |
| 2024/0213655 A1* | 6/2024 | Chang | H01Q 1/44 | |
| 2025/0125538 A1* | 4/2025 | Jo | H01Q 21/064 | |

FOREIGN PATENT DOCUMENTS

| | | | |
|---|---|---|---|
| KR | 20230071693 A | 5/2023 | |
| WO | 2022098076 A1 | 5/2022 | |
| WO | 2022242357 A1 | 11/2022 | |
| WO | 2023090800 A1 | 5/2023 | |

* cited by examiner

1300

1500

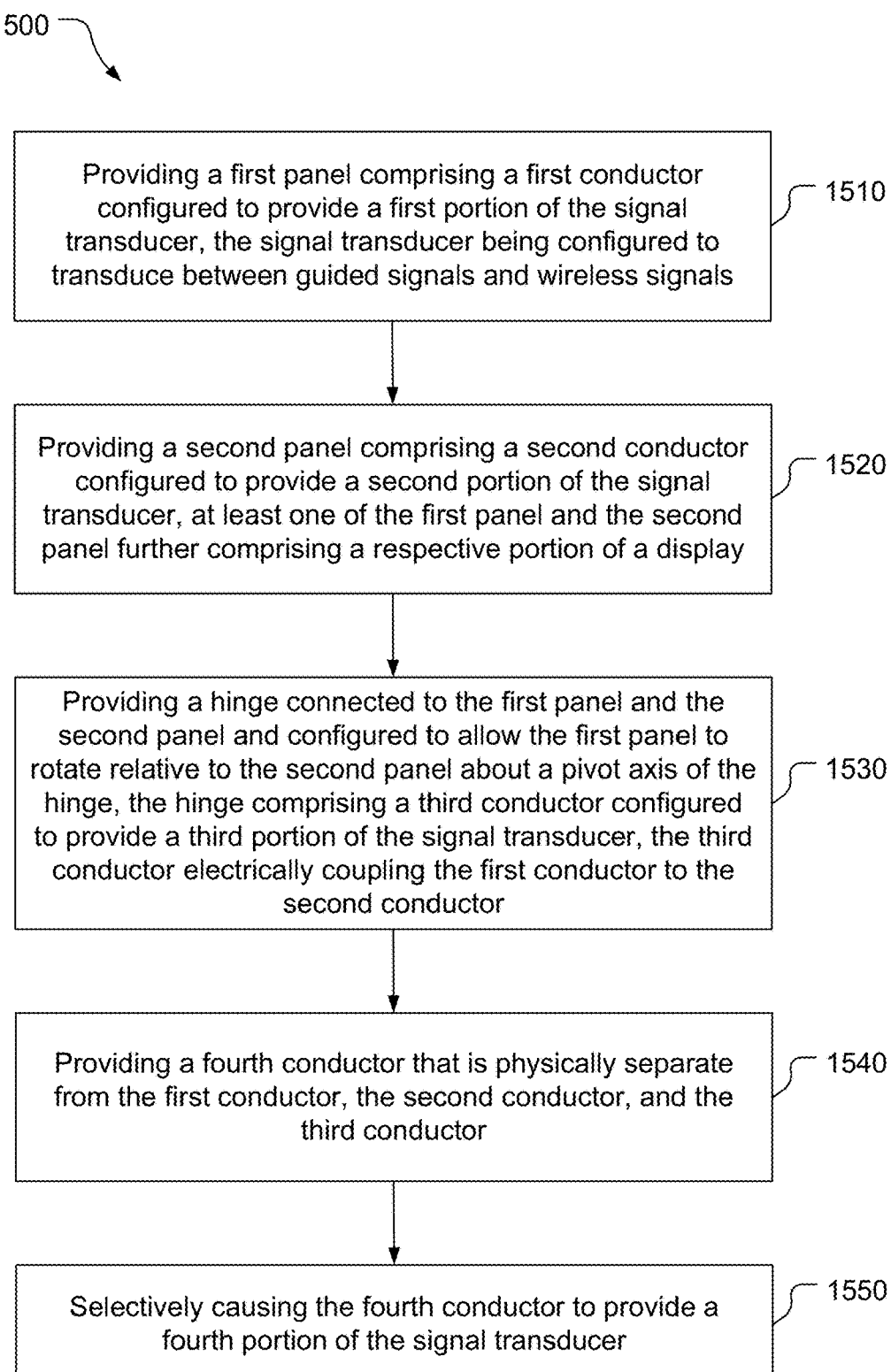

Providing a first panel comprising a first conductor configured to provide a first portion of the signal transducer, the signal transducer being configured to transduce between guided signals and wireless signals — 1510

Providing a second panel comprising a second conductor configured to provide a second portion of the signal transducer, at least one of the first panel and the second panel further comprising a respective portion of a display — 1520

Providing a hinge connected to the first panel and the second panel and configured to allow the first panel to rotate relative to the second panel about a pivot axis of the hinge, the hinge comprising a third conductor configured to provide a third portion of the signal transducer, the third conductor electrically coupling the first conductor to the second conductor — 1530

Providing a fourth conductor that is physically separate from the first conductor, the second conductor, and the third conductor — 1540

Selectively causing the fourth conductor to provide a fourth portion of the signal transducer — 1550

FIG. 15

1600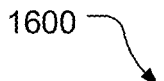

Selectively coupling a first-panel conductor, of a first panel of the foldable UE, to a first conductor of the first panel ⌐ 1610

Selectively coupling a radio frequency circuit of a second panel of the foldable UE to either a second-panel conductor of the second panel or to a second conductor of the second panel, at least one of the first panel and the second panel comprising a respective portion of a display wherein:
the first conductor is electrically coupled to the second conductor by a third conductor of a hinge that is connected to the first panel and the second panel and that is configured to allow the first panel to rotate relative to the second panel about a pivot axis of the hinge;

the first-panel conductor, the first conductor, the second conductor, and the third conductor form the signal transducer with the first-panel conductor selectively coupled to the first conductor and the radio frequency circuit selectively coupled to the second conductor; and the first conductor, the second conductor, the third conductor, and the second-panel conductor form the signal transducer with the first-panel conductor selectively uncoupled from the first conductor and the radio frequency circuit selectively coupled to the second-panel conductor

FOLDABLE DEVICE WITH HINGE-INTEGRATED ANTENNA

BACKGROUND

Wireless communication devices are increasingly popular and increasingly complex. For example, mobile telecommunication devices have progressed from simple phones, to smart phones with multiple communication capabilities (e.g., multiple cellular communication protocols, Wi-Fi, BLUETOOTH® and other short-range communication protocols), supercomputing processors, cameras, etc. Wireless communication devices have antennas to support various functionality such as communication over a range of frequencies, reception of Global Navigation Satellite System (GNSS) signals, also called Satellite Positioning Signals (SPS signals), etc.

With several antennas disposed in a single wireless communication device, available volume for antennas is at a premium. For example, smartphones may have numerous antennas (e.g., eight antennas, 10 antennas, or more) with very limited volume due to the size of devices that consumers desire. Consequently, antenna clearance may be limited to very small volumes, e.g., with widths of 4 mm or less.

Despite the volume restrictions for antennas, desired functionality of the antennas continues to increase. The trend in consumer electronics is to develop RF assemblies (radio frequency assemblies) with small form factors which can be easily accommodated within the limited space of the emerging smart devices including cell phones and tablets. The physical requirements of antennas make maintaining or improving performance (e.g., in terms of coverage, latency, and quality of service over desired coverage area) difficult.

Forthcoming smart devices will be equipped with 5G technology and may be configured to operate over a wide range of frequencies. For example, currently allocated spectrum for 5G includes 0.41 GHz-7.125 GHz and 24.25 GHz-52.6 GHz, including five popular bands n258 (24.25-27.5 GHZ), n261 (27.5-28.35 GHZ), n257 (26.5-29.5 GHZ), n260 (37.0-40.0 GHZ), and n259 (39.5-43.5 GHz). Further, frequencies from 7.1 GHz to 24.25 GHz are receiving interest, in particular the 13 GHZ band (12.75 GHz-13.25 GHz).

The use of smart devices has led to the desire to have large screens for viewing and accessing data. At the same time, users of smart devices also want small form factors for the devices when not in use. In response to these contradictory desires, some devices have been made to be foldable (e.g., including foldable displays) to decrease a form factor, e.g., while the device is not in use. Foldable smart devices, however, may hinder performance of antennas of the smart devices, particularly while the foldable device is folded, possibly blocking energy into and/or out of one or more antennas of the device.

SUMMARY

An example foldable UE (user equipment) includes: a first panel comprising a first conductor configured to provide a first portion of a signal transducer that is configured to transduce between guided signals and wireless signals; a second panel comprising a second conductor configured to provide a second portion of the signal transducer, at least one of the first panel and the second panel further comprising a respective portion of a display; a hinge connected to the first panel and the second panel and configured to allow the first panel to rotate relative to the second panel about a pivot axis of the hinge, the hinge comprising a third conductor configured to provide a third portion of the signal transducer, the third conductor electrically coupling the first conductor to the second conductor; a fourth conductor that is physically separate from the first conductor, the second conductor, and the third conductor; and a selection mechanism configured to selectively cause the fourth conductor to provide a fourth portion of the signal transducer.

An example method of configuring a signal transducer of a foldable UE includes: providing a first panel comprising a first conductor configured to provide a first portion of the signal transducer, the signal transducer being configured to transduce between guided signals and wireless signals; providing a second panel comprising a second conductor configured to provide a second portion of the signal transducer, at least one of the first panel and the second panel further comprising a respective portion of a display; providing a hinge connected to the first panel and the second panel and configured to allow the first panel to rotate relative to the second panel about a pivot axis of the hinge, the hinge comprising a third conductor configured to provide a third portion of the signal transducer, the third conductor electrically coupling the first conductor to the second conductor; providing a fourth conductor that is physically separate from the first conductor, the second conductor, and the third conductor; and selectively causing the fourth conductor to provide a fourth portion of the signal transducer.

Another example foldable UE includes: a first panel comprising a first conductor configured to provide a first portion of a signal transducer that is configured to transduce between guided signals and wireless signals; a second panel comprising a second conductor configured to provide a second portion of the signal transducer, at least one of the first panel and the second panel further comprising a respective portion of a display; a hinge connected to the first panel and the second panel and configured to allow the first panel to rotate relative to the second panel about a pivot axis of the hinge, the hinge comprising a third conductor configured to provide a third portion of the signal transducer, the third conductor electrically coupling the first conductor to the second conductor; a fourth conductor that is physically separate from the first conductor, the second conductor, and the third conductor; and means for selectively causing the fourth conductor to provide a fourth portion of the signal transducer.

BRIEF DESCRIPTION OF THE DRAWINGS

FIG. 15 is a block flow diagram of a method of configuring a signal transducer of a foldable UE.

FIG. 16 is a block flow diagram of another method of configuring a signal transducer of a foldable UE.

DETAILED DESCRIPTION

Figure 1:
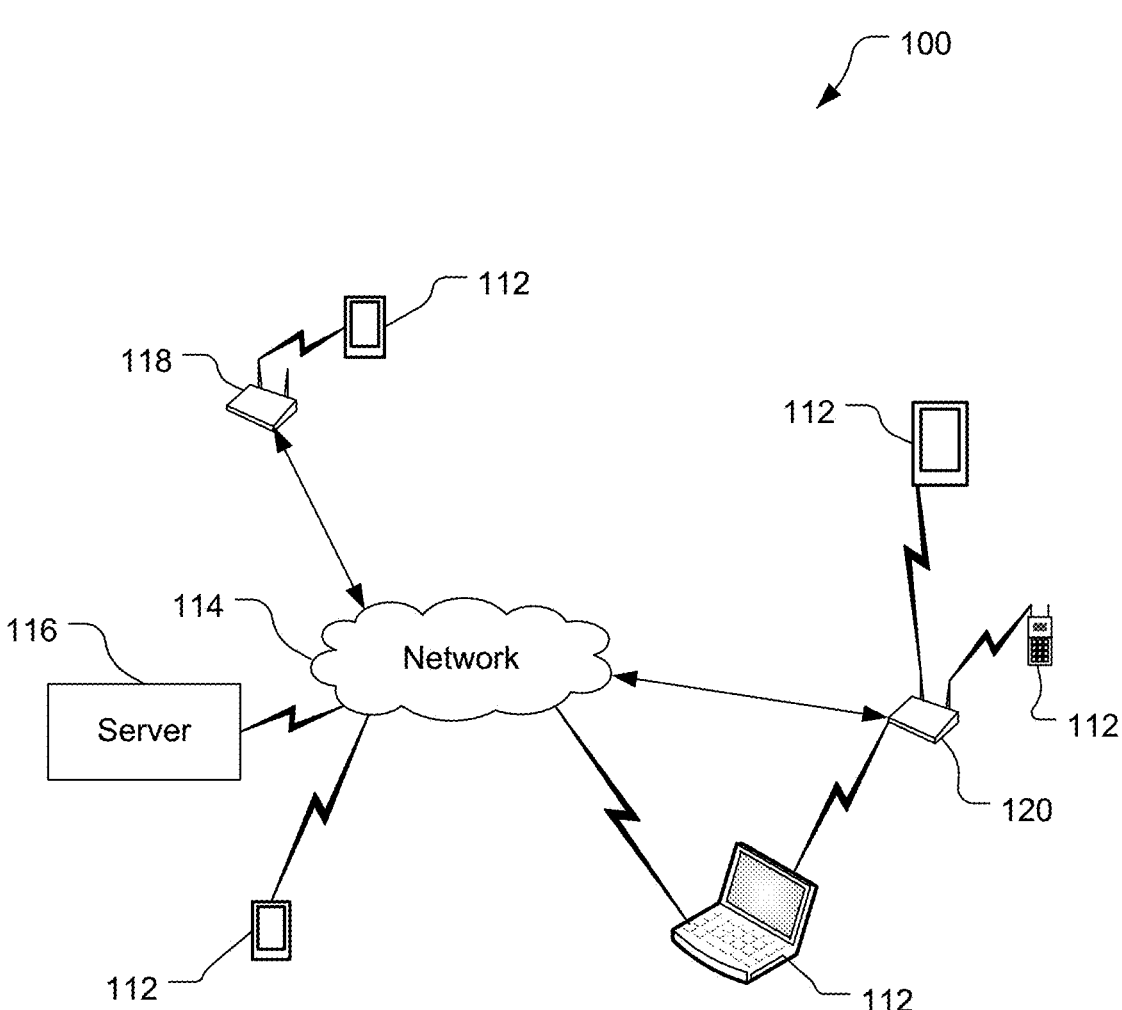
FIG. 1 is a schematic diagram of a communication system.

Techniques are discussed herein for hinge-integrated antennas for foldable UEs. For example, first and second conductors in different panels of a foldable UE, where the panels are pivotally connected to each other by a hinge, are electrically coupled through the hinge, which provides a third conductor. Radio frequency circuitry may be selectively coupled to a conductor proximate to the second conductor while a conductor proximate to the first conductor is isolated from the first conductor such that the first, second, and third conductors in combination with the conductor proximate to the second conductor form a signal transducer. The radio frequency circuitry may be selectively coupled to the second conductor while the conductor proximate to the first conductor is electrically coupled to the first conductor such that the first, second, and third conductors in combination with the conductor proximate to the first conductor form a signal transducer. The conductor proximate to the first conductor may be coupled to the first conductor via a selected reactance. Various hinge configurations may be used, e.g., to facilitate signal transduction and/or improve mechanical integrity of a UE with a hinge-integrated antenna. Example configurations may be configured to selectively couple a radio frequency source to one of several frame antenna portions (including a hinge) and selectively couple frame antenna portions to each other depending on whether a device containing the frame antenna portions is folded. A ground layer in a display may be partially removed in an area around the hinge and/or may be attached via an adhesive to the hinge. Other configurations, however, may be used.

Items and/or techniques described herein may provide one or more of the following capabilities, as well as other capabilities not mentioned. Antenna bandwidth may be improved for an antenna of a foldable UE. Antenna efficiency for a hinge-integrated antenna may be improved. A resonant frequency of a hinge-integrated antenna may be tuned to a desired frequency. Standalone and non-standalone modes of a foldable UE may be improved. Signal blockage of a foldable UE in a folded state may be reduced compared to prior devices. Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

As used herein, the term "user equipment" and "UE" are not specific to or otherwise limited to any particular Radio Access Technology (RAT), unless otherwise noted. In general, UEs may be any wireless communication device (e.g., a mobile phone, router, tablet computer, laptop computer, consumer asset tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," a "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE (Institute of Electrical and Electronics Engineers) 802.11, etc.) and so on. Further, two or more UEs may communicate directly in some configurations with or without passing information to each other through a network.

Referring to FIG. 1, a communication system 100 includes mobile devices 112, a network 114, a server 116, and access points (APs) 118, 120. The communication system 100 is a wireless communication system in that components of the communication system 100 can communicate with one another (at least sometimes) using wireless connections directly or indirectly, e.g., via the network 114 and/or one or more of the access points 118, 120 (and/or one or more other devices not shown, such as one or more base transceiver stations). For indirect communications, the communications may be altered during transmission from one entity to another, e.g., to alter header information of data packets, to change format, etc. The mobile devices 112 shown are mobile wireless communication devices (although they may communicate wirelessly and via wired connections) including mobile phones (including smartphones), a laptop computer, and a tablet computer. Still other mobile devices may be used, whether currently existing or developed in the future. Further, other wireless devices (whether mobile or not) may be implemented within the communication system 100 and may communicate with each other and/or with the mobile devices 112, network 114, server 116, and/or APs 118, 120. For example, such other devices may include internet of thing (IoT) devices, medical devices, home entertainment and/or automation devices, automotive devices, etc. The mobile devices 112 or other devices may be configured to communicate in different networks and/or for different purposes (e.g., 5G, Wi-Fi communication, multiple frequencies of Wi-Fi communication, satellite communication and/or positioning, one or more types of cellular communications (e.g., GSM (Global System for Mobiles), CDMA (Code Division Multiple Access), LTE (Long-Term Evolution), etc.), Bluetooth® communication, etc.).

Figure 2:
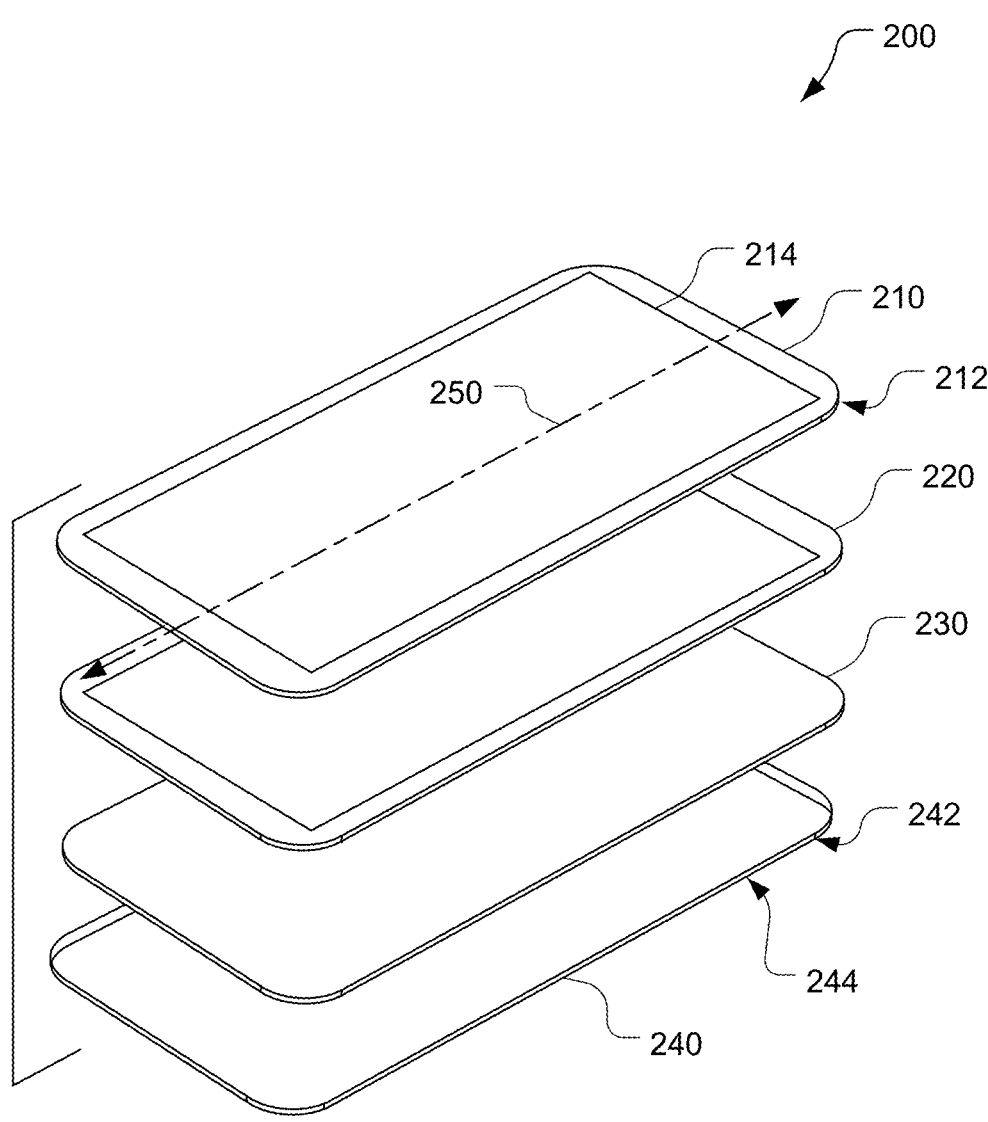
FIG. 2 is an exploded perspective view of simplified components of a mobile device shown in FIG. 1.

Referring to FIG. 2, a mobile device 200, which is an example of one of the mobile devices 112 shown in FIG. 1, includes a top cover 210, a display layer 220, a printed circuit board (PCB) layer 230, and a bottom cover 240. The mobile device 200 as shown may be a smartphone or a tablet computer but embodiments described herein are not limited to such devices. The top cover 210 includes a screen 214. The bottom cover 240 has a bottom surface 244. Sides 212, 242 of the top cover 210 and the bottom cover 240 provide an edge surface. The top cover 210 and the bottom cover 240 comprise a housing that retains the display layer 220, the PCB layer 230, and other components of the mobile device 200 that may or may not be on the PCB layer 230. For example, the housing may retain (e.g., hold, contain) or be integrated with antenna systems, front-end circuits, an inter-mediate-frequency circuit, and/or a processor, certain of which are discussed below. The housing may be substan-tially rectangular, having two sets of parallel edges in the illustrated embodiment, and may be configured to bend or fold. In this example, the housing has rounded corners, although the housing may be substantially rectangular with other shapes of corners, e.g., straight-angled (e.g., 45°) corners, 90°, other non-straight corners, etc. Further, the size and/or shape of the PCB layer 230 may not be commensu-rate with the size and/or shape of either of the top or bottom covers or otherwise with a perimeter of the device. For example, the PCB layer 230 may have a cutout to accept a battery. Further, the PCB layer 230 may include sandwiched boards and/or a PCB daughter board. Daughter boards may be chosen to facilitate a design and/or manufacturing pro-cess, e.g., to reinforce a functional separation or to better utilize a space in the housing. Embodiments of the PCB layer 230 other than those illustrated may be implemented.

The device 200 may be foldable and/or bendable. For example, the top cover 210, the display layer 220, the PCB layer 230, and the bottom cover 240 may be configured to pivot (e.g., fold or bend), e.g., about an axis 250 or a respective axis parallel to the axis 250. Also or alternatively, the device 200 may be configured to pivot about another axis, e.g., an axis perpendicular to the axis 250. The PCB layer 230 and/or the bottom cover 240 may be split into multiple parts which are operably (for the PCB layer) or physically (for the bottom cover) coupled together and configured to pivot with respect to each other.

The limited space available in a UE (e.g., a smartphone, tablet computer, etc.) presents antenna design challenges. For example, with 10 or more antennas (e.g., for LTE and sub-6 GHZ band) in a mobile phone, there may be little or no additional space available for another antenna. Because antenna frequency bandwidth varies with antenna size, with small antennas typically having narrow bandwidths, design-ing a single antenna to cover a wide frequency bandwidth is challenging. Further, mechanical stability of a UE (e.g., a mobile phone) may be challenging, e.g., because non-conductive (e.g., plastic) gaps in a metal frame of the UE may be needed to separate antennas, but may weaken stability of the frame and may result in thermal issues due to an inability to dissipate heat.

Figure 3:
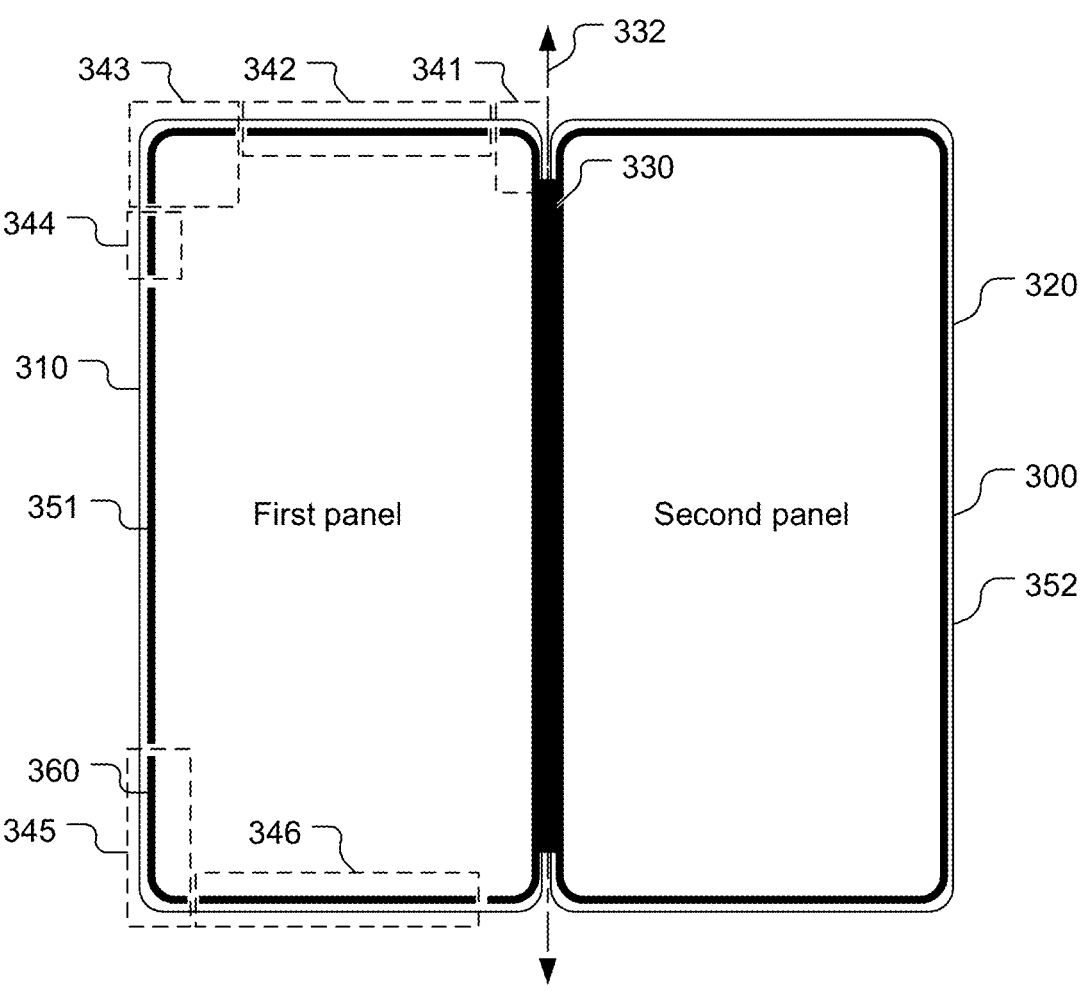
FIG. 3 is a plan view of a foldable user equipment (UE), including panels pivotally connected by a hinge, in an unfolded state.

Referring also to FIG. 3, a foldable UE 300 may include a first panel 310, a second panel 320, and a hinge 330. The hinge 330 is connected to the first panel 310 and the second panel 320 and configured to enable the first panel 310 to rotate relative to the second panel 320 about a pivot axis 332 of the hinge 330. The UE 300 includes antennas 341, 342, 343, 344, 345, 346. In this example, each of the antennas 341-346 includes one or more portions of metal (e.g., a metal portion 360 of the antenna 345) disposed proximate to a perimeter of a respective one of the panels 310, 320. The metal portions may form a part of a frame of the UE 300 or may be disposed within respective case portions 351, 352 (e.g., the top cover 210 and the bottom cover 240). The quantity and locations of the antennas 341-346 are examples, and other quantities of antennas and/or placement of antennas may be used. The antennas 341-346 may be configured to transduce signals between wireless signals and guided signals (e.g., electrical signals) for one or more of a variety of purposes, e.g., phone communication (including with one or more satellites), V2X (Vehicle-to-Everything communication), Satellite Positioning System (SPS) signal reception, etc.

The foldable UE 300 may meet requirements for 4G CA (Carrier Aggregation) and/or 5G ENDC (E-UTRAN (Evolved Universal Mobile Telecommunications System Terrestrial Radio Access Network) New Radio-Dual Con-nectivity) and/or 5G carrier aggregation. By implementing CA, the UE 300 may utilize multiple component carriers.

The terms "SA" (standalone) and "NSA" (non-stand-alone) are formally used in 5G systems, for example to indicate whether a 5G network is being used for all com-munications with a device such as a UE or whether (control) signaling is communicated over a 4G network/channels while data communications are over a 5G network/channels, respectively. These terms, however, may also be used in other contexts and/or to refer to other operations of a device. For example, a non-CA mode in 4G may be referred to as a "standalone" (SA) mode because it uses only one single component carrier. Similarly, a CA mode in 4G may be referred to as a "non-standalone" (NSA) mode because multiple carriers are utilized. Thus, using 4G CA, in a 4G NSA mode or connection, allows a device to access different LTE bands concurrently, e.g., B8+B3. This NSA connection may be used, e.g., where the UE 300 is in a strong signal environment, such that throughput may be greater than using a non-CA mode or SA mode. In the non-CA or 4G SA mode, the UE 300 may access a single 4G carrier, e.g., B5 only. The UE 300 may be configured to use the SA mode during a weak signal condition to boost a received signal, e.g., to avoid a call drop. In 4G non-CA (SA) mode, signal quality may not allow a CA connection.

On the other hand, in order to access 5G networks, a 5G NSA or EN-DC mode may be used, e.g., where the UE 300 is near a 5G base station, such that throughput may be greater than using a 4G network only. In the 5G NSA mode, the UE 300 may access 5G networks through a 4G LTE network anchor. The UE 300 may be configured to use the NSA mode to maintain the connection. In the 5G SA mode, the UE 300 may access a single 5G network. The UE 300 may be configured to use a 5G SA CA mode or 5G SA non-CA mode during a strong signal condition to boost throughput or a weak signal condition to avoid a call drop, respectively.

Figure 4:
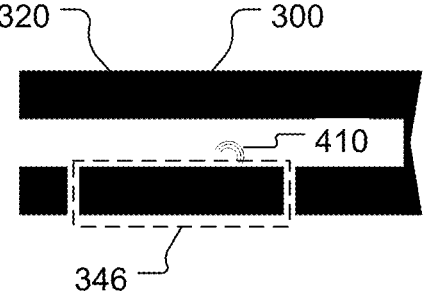
FIG. 4 is a side view of the foldable user equipment shown in FIG. 3 in a folded state.

Referring also to FIG. 4, that is a view of a bottom of the UE 300 with the panel 320 folded onto the panel 310, desired UE features may present challenges for effective antenna performance. For example, due to demand for a high screen-to-body ratio and bezel-less body designs, there may be very small clearances for one or more of the antennas 341-346. The small clearance may present chal-lenges for achieving desired bandwidth and radiation effi-ciency, especially in view of ever-increasing bandwidth desires (e.g., for LTE, NR (New Radio), CA, ENDC appli-cations). The small antenna clearance and design trade-offs make concurrently maintaining both NSA mode and SA mode performance difficult. For example, supporting an NSA mode connection when a received signal is weak is difficult, and may result in a call drop if the antenna performance is too critical to maintain even an SA connection. In the folded state, incoming and/or outgoing signals to/from an antenna, such as signals 410 from the antenna 346, may be inhibited by a panel overlying the antenna, e.g., the second panel 320 overlying the antenna 346.

Figure 5:
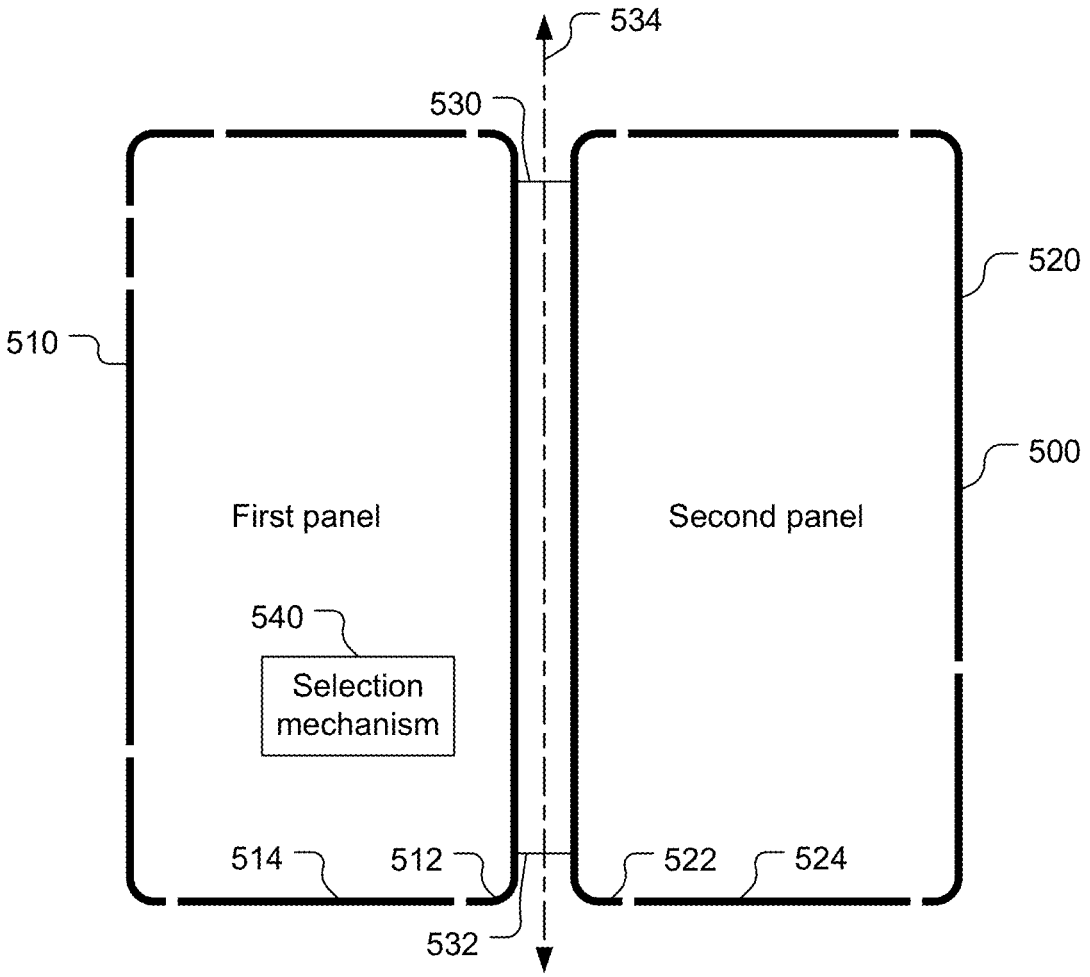
FIG. 5 is a plan view of an example foldable UE, including an antenna using a hinge and conductors in each of two panels, in an unfolded state.

Referring to FIG. 5, a foldable UE 500 includes a first panel 510, a second panel 520, a hinge 530, and a selection mechanism 540. The first panel 510, the second panel 520, and the hinge 530, include a first conductor 512, a second conductor 522, and a third conductor 532, respectively. The conductors 512, 522, 532 may comprise respective portions of a signal transducer and may be electrically coupled to each other. For example, a first portion of the third conductor 532 may be integral with the first conductor 512 and a second portion of the third conductor 532 may be integral with the second conductor 522, with the first and second portions of the third conductor 532 being electrically and pivotally coupled to each other, e.g., about a pivot axis 534. The foldable UE 500 further includes a fourth conductor which may be a first-panel conductor 514 or a second-panel conductor 524, and the selection mechanism 540 may be configured to cause the fourth conductor to provide another portion of the signal transducer in addition to the first conductor 512, the second conductor 522, and the third conductor 532. The signal transducer is configured to convert signals between wireless signals and guided signals (e.g., electrical signals).

Figure 6:
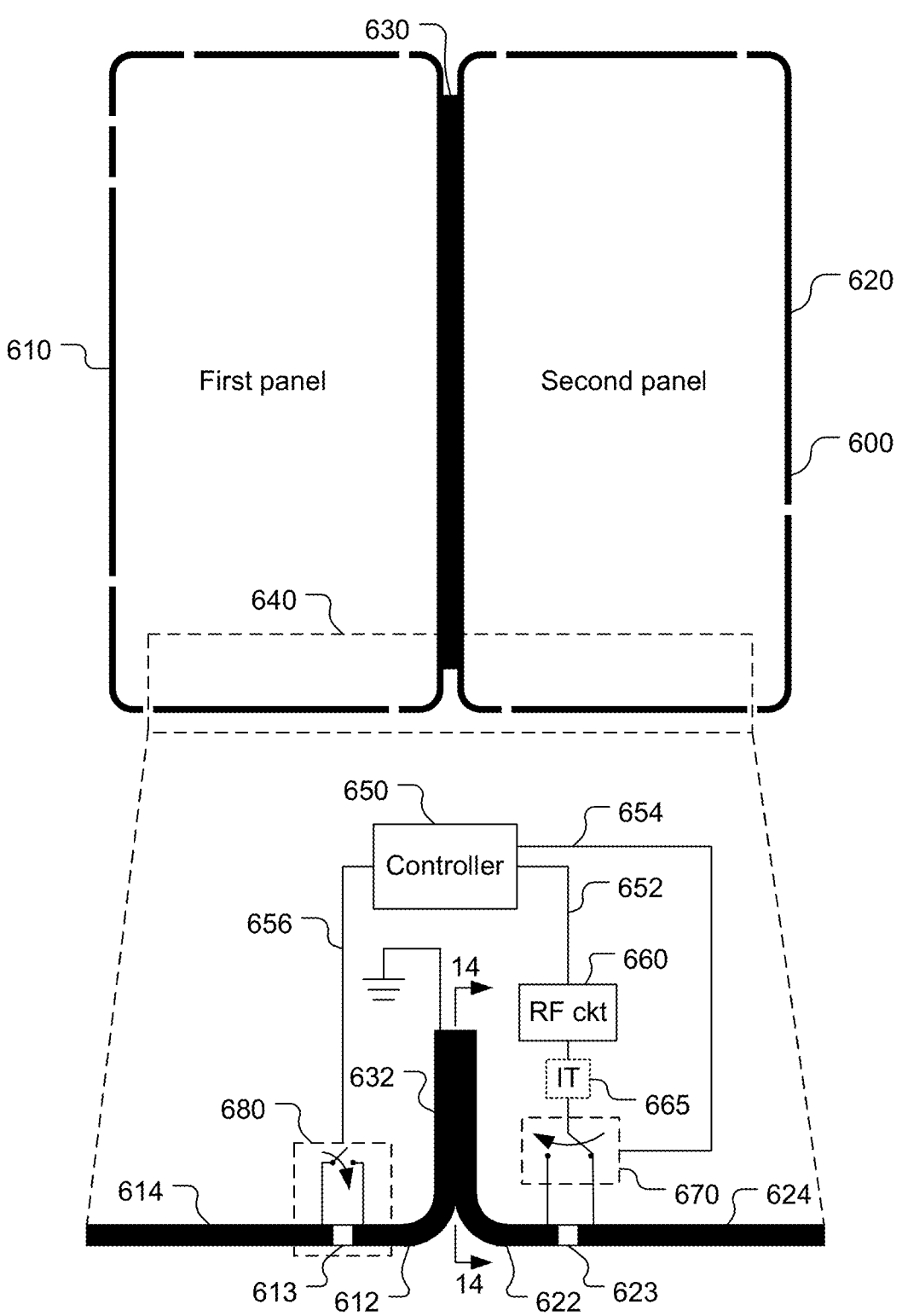
FIG. 6 is a partial plan view and partial circuit diagram of an antenna of an example of the UE shown in FIG. 5, in a first state.

Referring also to FIG. 6, a foldable UE 600 is an example of the foldable UE 500 and includes a first panel 610, a second panel 620, a hinge 630, an antenna 640, a controller 650, and RF circuitry 660 (Radio Frequency circuitry). The antenna 640 is a hinge-integrated antenna in that the hinge 630 forms a portion of the antenna 640, e.g., a portion of a signal transducer of the antenna 640. The antenna 640 spans the first panel 610 and the second panel 620. The antenna 640 may operate efficiently over multiple frequency bands, e.g., the LB and the MHB, and may operate in different configurations for different modes, e.g., SA mode and NSA mode. The RF circuitry 660 may include circuitry to receive and process RF signals from the antenna 640 and/or circuitry to produce signals for transmission by the antenna 640. The controller 650 may comprise a computing platform including a processor and memory including software. The processor and the memory may be communicatively coupled to each other by a bus. The processor may include one or more hardware devices, e.g., a central processing unit (CPU), a microcontroller, an application specific integrated circuit (ASIC), etc. The processor may comprise multiple processors (e.g., including a general-purpose/application processor, a DSP, a modem processor, a video processor, and/or a sensor processor). The memory may be a non-transitory storage medium that may include random access memory (RAM)), flash memory, disc memory, and/or read-only memory (ROM), etc. The memory may store software which may be processor-readable, processor-executable software code containing instructions that are configured to, when executed, cause the processor to perform various functions described herein. Alternatively, the software may not be directly executable by the processor but may be configured to cause the processor, e.g., when compiled and executed, to perform the functions.

The antenna 640 includes a first conductor 612 (of the first panel 610), a second conductor 622 (of the second panel 620), a third conductor 632 (of the hinge 630), and selectively a fourth conductor. The hinge 630 is connected to ground, e.g., a main ground of the UE 600 such as a PCB ground in the first panel 610 or a PCB ground in the second panel 620. A switch 670 (that is optional) may be electrically coupled to the RF circuitry 660 (e.g., via an optional impedance tuner 665) and to the controller 650. The switch 670 may be configured to selectively electrically couple the RF circuitry 660 to the second conductor 622 or to a second-panel conductor 624 (which would then be the fourth conductor). The second-panel conductor 624 is physically separate from the conductors 612, 614, 622, 632, with the second-panel conductor 624 not being integral with any of the conductors 612, 614, 622, 632 and being separated from the second conductor 622 by an insulator 623. The insulator 623 may be an air gap or a solid, electrically-insulating material. A switch 680 may be electrically coupled to the first conductor 612 and a first-panel conductor 614, and configured to selectively electrically couple the first conductor 612 to the first-panel conductor 614 (which would then be the fourth conductor) or to isolate the first conductor 612 from the first-panel conductor 614. The first-panel conductor 614 is physically separate from the conductors 612, 622, 624, 632, with the first-panel conductor 614 not being integral with any of the conductors 612, 622, 624, 632 and being separated from the first conductor 612 by an insulator 613. The insulator 613 may be an air gap or a solid, electrically-insulating material. The controller 650 may be communicatively coupled to the switches 670, 680, and possibly communicatively coupled to the RF circuitry 660. The controller 650 may be configured to provide a control signal 652 to the RF circuitry 660, e.g., to cause the RF circuitry 660 to produce and provide a transmit signal to the switch 670, or to process a signal received from the switch 670.

The impedance tuner 665 may be configured to provide fine tuning, for example in any of multiple modes. For example, the impedance tuner 665 may allow for fine tuning in a 4G NSA mode and a 4G SA mode. In some modes (e.g., including a 4G SA mode), the impedance tuner 665 is configured to provide fine tuning for the second conductor 622 in combination with the first and third conductors 612, 622 and potentially the conductor 614, for example when the switch 680 electrically couples the first conductor 612 with the first-panel conductor 614 and the switch 670 electrically couples the RF circuitry 660 to the second conductor 622. In some modes, (e.g., including a 4G NSA mode), the impedance tuner 665 is configured to provide fine tuning for the second-panel conductor 624 in combination with the conductors 622, 632, and 612, for example when the switch 680 electrically disconnects the first conductor 612 from the first-panel conductor 614 and the switch 670 electrically couples the RF circuitry 660 to the second-panel conductor 624.

Figure 7:
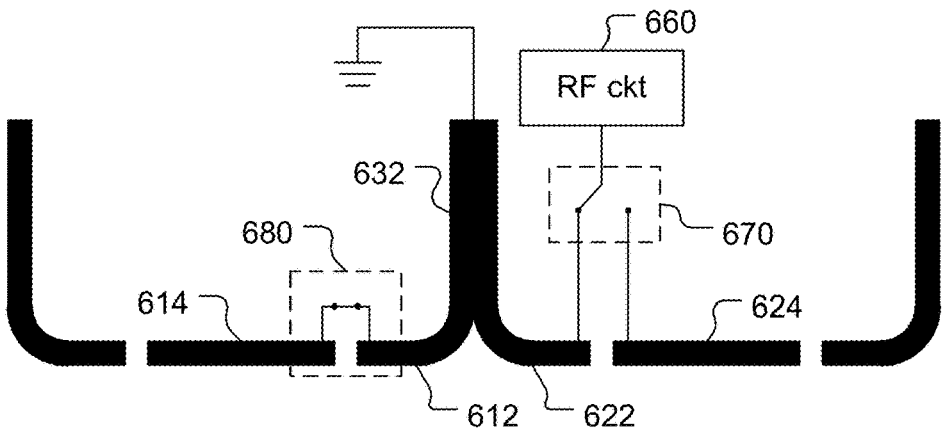
FIG. 7 is a partial plan view and partial circuit diagram of the antenna shown in FIG. 6 in a second state.

The controller 650 may be configured to provide control signals 654, 656 to the switches 670, 680, respectively, to implement different configurations of signal transducers of the antenna 640, e.g., for different operational modes. For example, the control signal 654 may cause the switch 670 to couple the RF circuitry 660 to the second conductor 622 or to couple the RF circuitry 660 to the second-panel conductor 624. The control signal 656 may cause the switch 680 to couple the first conductor 612 to the first-panel conductor 614 or to isolate the first conductor 612 from the first-panel conductor 614. The controller 650 may be configured to actuate the switches 670, 680 such that the RF circuitry 660 is coupled to the second-panel conductor 624 by the switch 670 concurrently with the first conductor 612 being isolated from the first-panel conductor 614 by the switch 680 (although the switch operations may not be initiated at the same time). With the RF circuitry 660 connected to the second-panel conductor 624 via the switch 670 and the first conductor 612 isolated from the first-panel conductor 614 via the switch 680, the conductors 612, 622, 624, 632 may form a signal transducer for transducing signals, e.g., in the LB and/or the MHB. For example, the second-panel conductor 624 may transduce LB signals, and a combination of the first conductor 612, the second conductor 622, the second-panel conductor 624, and the third conductor 632 may transduce MHB signals. This configuration may be particularly useful for implementing the NSA mode. Also or alternatively, as shown in FIG. 7, the controller 650 may be configured to actuate the switches 670, 680 such that the RF circuitry 660 is coupled to the second conductor 622 via the switch 670 concurrently with the first-panel conductor 614 being coupled to the first conductor 612 via the switch 680 (although the switch operations may not be initiated at the same time). With the RF circuitry 660 coupled to the second conductor 622 and the first-panel conductor 614 coupled to the first conductor 612, the conductors 612, 614, 622, 632 may form a signal transducer for transducing signals, e.g., in the LB. In this configuration, the third conductor 632 of the hinge 630 may act as a shorting trace and the signal transducer (of the conductors 612, 614, 622, 632, the grounding of the conductor 632, and the RF circuitry 660) provides an inverted-F Antenna), with the hinge 630 providing a resonant path for a shorting path of the inverted-F. This configuration may be particularly useful for implementing the SA mode.

Figure 8:
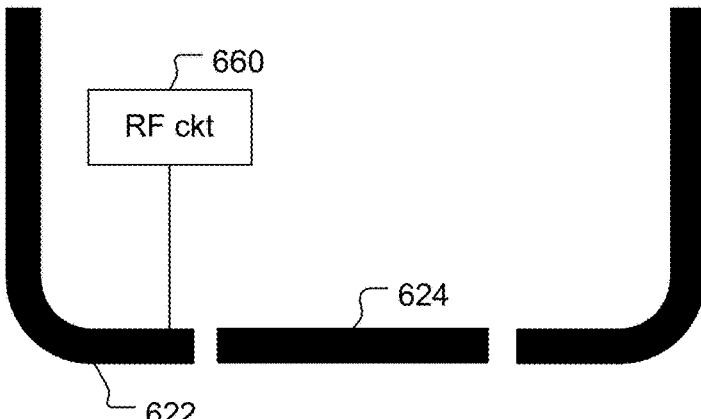
FIG. 8 is a partial plan view and partial circuit diagram of an alternative configuration of a portion of the antenna shown in FIG. 6.

Referring also to FIG. 8, which illustrates a portion of the second panel 620, the RF circuitry 660 may be electrically coupled to the second conductor 622 permanently. i.e., the switch 670 may be omitted. With this configuration, the switch 680 may be omitted and the conductors 612, 614 coupled to each other, or integrated into a single conductor.

Figure 9:
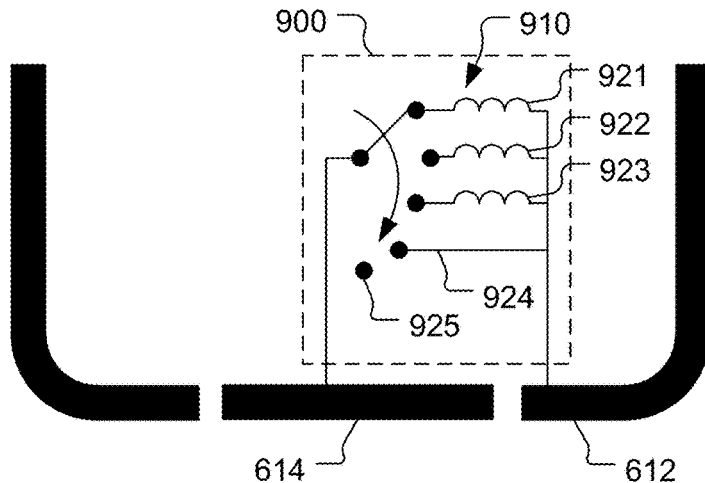
FIG. 9 is a partial plan view and partial circuit diagram of an example of a switch shown in FIG. 6 having multiple selectable reactances.

Referring also to FIG. 9, which illustrates a potion of the first panel 610, various configurations of the switch 680 may be used. For example, the switch 680 may include a variable reactance such that the control signal 656 may cause the switch 680 to couple the conductors 612, 614 via one of multiple selectable reactances. The variable reactance may have a continuum of possible reactance values, e.g., with the variable reactance possibly provided by a variable capacitor (varactor). As another example, as shown in FIG. 9, a switch 900, which is an example of the switch 680, includes a variable inductor 910 provided by a set of discrete inductors 921, 922, 923 each with a distinct inductance value. Each of the inductors 921-923 may be selected and coupled to in order to put the selected inductor 921-923 in series between the conductors 612, 614. The switch 900 also includes a short 924 that may be selected, instead of one of the inductors 921-923 (e.g., with zero inductance other than inherent inductance in the short 924). The switch 900 also includes a post 925 that may be selected, instead of one of the inductors 921-923 or the short 924, to provide an open circuit such that the conductors 612, 614 are electrically isolated (although there may be some reactive coupling between the conductors 612, 614). The switch 900 may be controlled to provide a selected reactance to tune the antenna for a desired frequency or frequency range. A separate aperture tuner may additionally or alternatively be coupled to the first-panel conductor 614.

Figure 10:
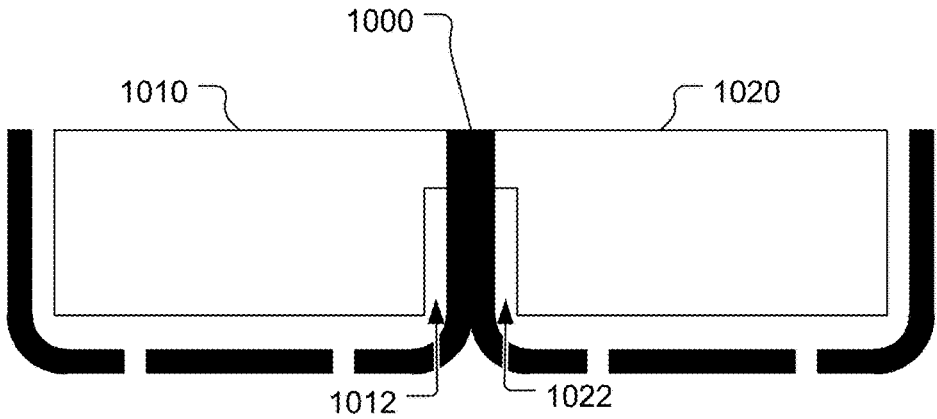
FIG. 10 is a plan view of a portion of a foldable UE with an example hinge configuration for a hinge-integrated antenna.
Figure 11:
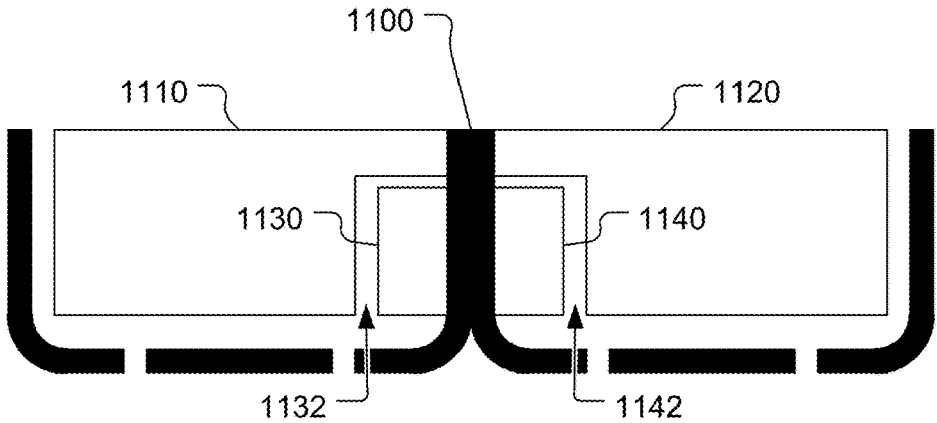
FIG. 11 is a plan view of a portion of a foldable UE with another example hinge configuration for a hinge-integrated antenna.
Figure 12:
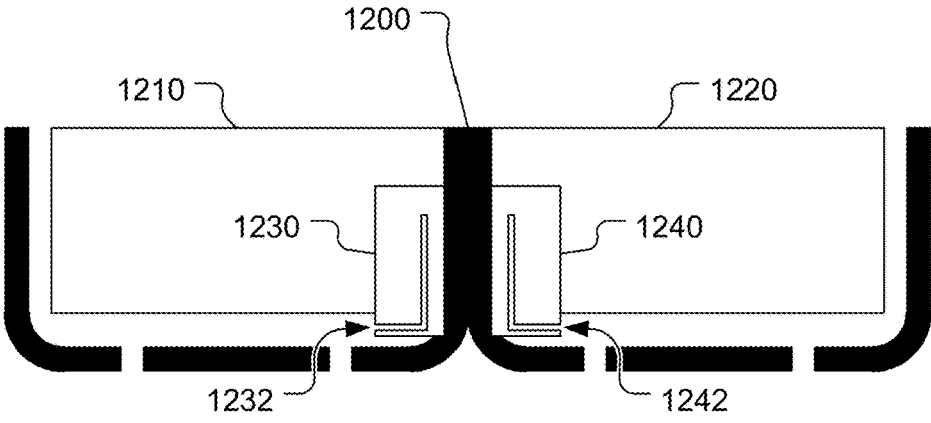
FIG. 12 is a plan view of a portion of a foldable UE with another example hinge configuration for a hinge-integrated antenna.

Referring also to FIGS. 10-12, various configurations of hinges may be used in the examples described above. The example hinge configurations shown in FIGS. 10-12 are non-exhaustive, and numerous other configurations may be used. For example, as shown in FIG. 10, a portion of a foldable, two-panel UE includes a hinge 1000, a first-panel PCB 1010, and a second-panel PCB 1020. The hinge 1000 may be electrically connected to ground via one or more of the PCBs 1010, 1020 (e.g., being directly connected to PCB ground and/or to a PCB trace to ground). The hinge 1000 is, in this example, electrically separated from respective portions of the PCBs 1010, 1020 by respective gaps 1012, 1022 (e.g., air-filled gaps or dielectric-filled gaps), with the hinge 1000 forming part of a signal transducer and a conductor that is part of a frame of a UE used as a shorting trace. The gaps 1012, 1022 provide resonant slots from which signals may radiate and/or into which signals may be received. This configuration may provide good performance, e.g., radiation/reception efficiency. As another example, as shown in FIG. 11, a portion of a foldable, two-panel UE includes a hinge 1100, a first-panel PCB 1110, a second-panel PCB 1120, and hinge flanges 1130, 1140. The hinge 1100 may be electrically coupled to ground via one or more of the PCBs 1110, 1120 (e.g., being directly connected to PCB ground and/or to a PCB trace to ground). The hinge flanges 1130, 1140 may be electrically connected to the hinge 1100 and electrically separated by respective gaps 1132, 1142 from the PCBs 1110, 1120. The gaps 1132, 1142 provide resonant slots from which signals may radiate and/or into which signals may be received. The configuration shown in FIG. 11 may provide more mechanical stability than the configuration shown in FIG. 10. As another example, as shown in FIG. 12, a portion of a foldable, two-panel UE includes a hinge 1200, a first-panel PCB 1210, a second-panel PCB 1220, and hinge flanges 1230, 1240. The hinge flanges 1230, 1240 may be electrically connected to the hinge 1200 and to the PCBs 1210, 1220, respectively. The hinge flanges may be attached to the PCB 1220 and/or to another portion (e.g., a cover) of the UE by non-electrically-conductive fasteners, e.g., screws. The hinge flanges 1230, 1240 are configured to define respective gaps 1232, 1242 that provide resonant slots from which signals may radiate and/or into which signals may be received. The configuration shown in FIG. 12 may provide more mechanical stability than the configuration shown in FIG. 10.

Figure 13:
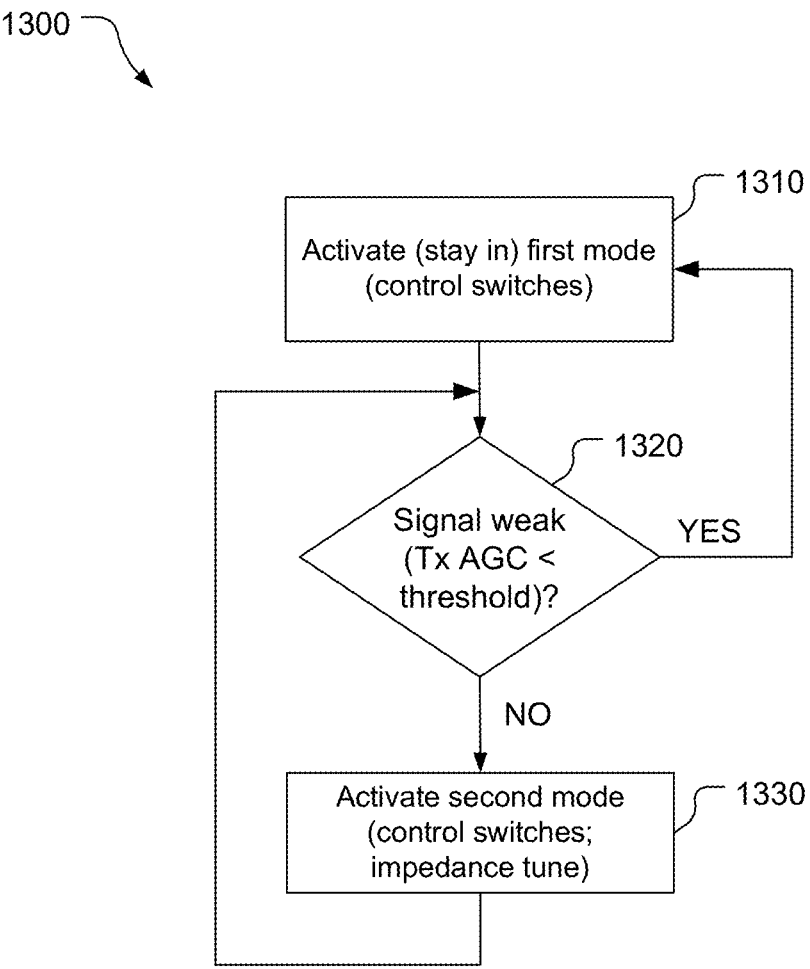
FIG. 13 is a block flow diagram of operating the antenna shown in FIG. 6.

Referring to FIG. 13, a method 1300 of operating the antenna 640 includes the stages shown. The method 1300 is, however, an example and not limiting, and may be altered. The method 1300 can adapt the antenna for operation in two modes. In some examples, the two modes are a 4G NSA mode and a 4G SA mode as appropriate.

At stage 1310, the antenna 640 is operated in a first mode. For example, the controller 650 sends the control signal 654 to cause the switch 670 to couple the RF circuit to the second-panel conductor 624 and sends the control signal 656 to cause the switch 680 to isolate the first conductor 612 from the first-panel conductor 614. Alternatively, if the antenna 640 is already in the first mode, then the controller 650 continues to cause the switches 670, 680, or at least does not disable the switches 670, 680, from implementing the first mode.

At stage 1320, an inquiry is made as to whether a transmit signal is too weak for reception, e.g., by a base station, in the first mode. For example, the controller 650 may determine whether a transmission automatic gain control (AGC) level is below a threshold (e.g., whether a power provided by a power amplifier of the RF circuitry 660 is below a threshold). The AGC level may be increased based on lack of, or poor, reception of a signal transmitted by the UE 600. If the AGC level is at or above the threshold, then the method 1300 proceeds to stage 1330. If the AGC level is below the threshold, then the method 1300 returns to stage 1310 where the first mode continues to be implemented and the AGC level is checked again at stage 1320.

At stage 1330, the antenna 640 is operated in a second mode. For example, the controller 650 sends the control signal 654 to cause the switch 670 to couple the RF circuit to the second conductor 622 and sends the control signal 656 to cause the switch 680 to couple the first conductor 612 to the first-panel conductor 614. The controller 650 may also send a control signal to the switch 680 (e.g., the switch 900 acting as an aperture tuner) to tune the antenna 640. Implementing the second mode with the conductors 612, 614, 622, 632 and the switch 680 may provide a wider bandwidth and/or better radiation efficiency than previous antennas, which may facilitate the controller 650 determining (setting) tuning provided by the switch 680. The method 1300 returns to stage 1320 to check the AGC level relative to the threshold. In some examples, the first mode is the 4G NSA mode and the second mode is the 4G SA mode, and the method 1300 may be used, for example, such that the 4G SA mode will continue to be implemented as long as appropriate, and the 4G NSA mode will be implemented if possible (e.g., to improve bandwidth and throughput).

Techniques discussed herein may be used to provide support for multiple frequency bands of operation, including concurrent operation. For example, the conductors 612, 622, 624, 632, may be used for operation in the LB and the MHB at the same time, and the conductor 614 used (e.g., with another RF circuit coupled to the conductor 614) for operation in the LB (e.g., for MIMO (Multiple Input Multiple Output) operation), such that the UE 600 may support LB+LB CA or even ENDC operation. For example, with the conductors 612, 622, 624, 632 connected for LB operation, the conductor 614 may be used for MHB operation. Other antennas of the UE 600 may support other operation, e.g., in the LB, MHB, and/or UHB. Simulations have shown that bandwidth may be increased, relative to a standard inverted-F antenna, with the antenna 640 in an unfolded mode (with the UE 600 in an unfolded state as shown in FIG. 6) or a folded mode (with the UE 600 in a folded state similar to the UE 300 in FIG. 4).

Figure 14:
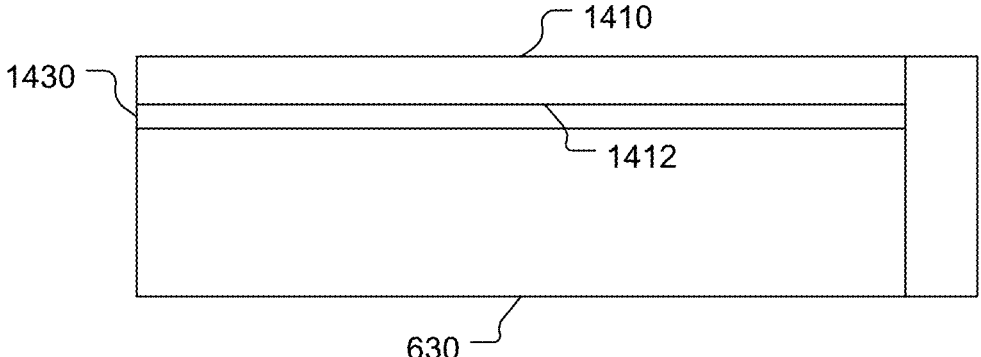
FIG. 14 is a cross-sectional view of the antenna shown in FIG. 6, taken along line 14-14, with a screen attached to the hinge shown in FIG. 6.

Referring to FIG. 14, with further reference to FIG. 6, a screen 1410 of the UE 600 may extend very close to edges of the UE 600, including close to the hinge 630. To inhibit electrical coupling between a conductive layer 1412 of the screen 1410 and the hinge 630, the screen 1410 may be connected to the hinge 630 using an insulating material 1430 such as an insulating adhesive of an appropriate thickness (e.g., 0.3 mm). Alternatively, the screen 1410, or at least the conductive layer 1412, may be configured not to overlie the hinge 630 such to inhibit or prevent the hinge 630 from electrically coupling to the conductive layer 1412. For example, the conductive layer 1412 may be formed with a shape that will not overlap with the hinge 630, or a portion of the conductive layer 1412 that would overlap with the hinge 630 may be removed (e.g., etched off).

Referring to FIG. 15, with further reference to FIGS. 5-13, a method 1500 of configuring a signal transducer of a foldable UE includes the stages shown. The method 1500 is, however, an example and not limiting. The method 1500 may be altered, e.g., by having one or more stages added, removed, rearranged, combined, performed concurrently, and/or having one or more single stages split into multiple stages.

At stage 1510, the method 1500 includes providing a first panel comprising a first conductor configured to provide a first portion of the signal transducer, the signal transducer being configured to transduce between guided signals and wireless signals. For example, the first panel 510 of the UE 500 is provided (e.g., by providing the UE 500), with the first panel 510 having the first conductor 512.

At stage 1520, the method 1500 includes providing a second panel comprising a second conductor configured to provide a second portion of the signal transducer, at least one of the first panel and the second panel further comprising a respective portion of a display. For example, the second panel 520 of the UE 500 is provided (e.g., by providing the UE 500), with the second panel 520 having the second conductor 522.

At stage 1530, the method 1500 includes providing a hinge connected to the first panel and the second panel and configured to allow the first panel to rotate relative to the second panel about a pivot axis of the hinge, the hinge comprising a third conductor configured to provide a third portion of the signal transducer, the third conductor electrically coupling the first conductor to the second conductor. For example, the hinge 530 is provided (e.g., by providing the UE 500).

At stage 1540, the method 1500 includes providing a fourth conductor that is physically separate from the first conductor, the second conductor, and the third conductor. For example, the first panel 510 is provided including the first-panel conductor 514 and/or the second panel 520 is provided including the second-panel conductor 524.

At stage 1550, the method 1500 includes selectively causing the fourth conductor to provide a fourth portion of the signal transducer. For example, the selection mechanism 540 may cause the first-panel conductor 514 to be combined (e.g., electrically connected via the switch 680) with the conductors 512, 522, 532 to form a signal transducer. As another example, the selection mechanism 540 may cause the second-panel conductor 524 to combine with (e.g., reactively couple with) the conductors 512, 522, 532 to form a signal transducer. The selection mechanism 540, e.g., in combination with the switch 670 and the second-panel conductor 524, may comprise means for selectively causing the fourth conductor to provide a fourth portion of the signal transducer. Alternatively, the selection mechanism 540, e.g., in combination with the switch 680 and the first-panel conductor 514, may comprise means for selectively causing the fourth conductor to provide a fourth portion of the signal transducer.

Implementations of the method 1500 may include one or more of the following features. In an example implementation, the fourth conductor is disposed in the second panel proximate to, but separate from, the second conductor, the method 1500 further includes providing RF circuitry configured to at least one of: receive and process a first RF signal from the signal transducer; and provide a second RF signal to the signal transducer, and selectively causing the fourth conductor to provide the fourth portion of the signal transducer comprises selectively coupling the RF circuitry to the fourth conductor to have the signal transducer comprise the first conductor, the second conductor, the third conductor, and the fourth conductor. For example, the second panel 620 includes the second-panel conductor 624 and the controller 650 may send the control signal 654 to cause the switch 670 to couple the RF circuitry 660 to the second-panel conductor 624 and send the control signal 656 to cause the switch 680 to isolate the first conductor 612 from the first-panel conductor 614 such that the conductors 612, 622, 624, 632 form a signal transducer. The controller 650, the RF circuitry 660, the switch 670, and the second-panel conductor 624 may comprise means for selectively coupling the RF circuitry to the fourth conductor. In a further example implementation, selectively coupling the RF circuitry to the fourth conductor comprises selectively coupling the RF circuitry to the fourth conductor for a non-standalone mode of the foldable UE. For example, the controller 650 may send the control signal 654 to cause the switch 670 to couple the RF circuit to the second-panel conductor 624 and send the control signal 656 to cause the switch 680 to isolate the first conductor 612 from the first-panel conductor 614 based on a desire to operate in NSA mode. In another further example implementation, the first panel further comprises a fifth conductor separate from and proximate to the first conductor, and wherein the method further comprises selectively coupling the fifth conductor to the first conductor. For example, the first panel 610 includes the first-panel conductor 614 and the controller 650 may send the control signal 656 to the switch 680 to cause the switch to electrically couple the first conductor 612 to the first-panel conductor 614. In a further example implementation, for a standalone mode of the foldable UE, the RF circuitry is coupled to the second conductor and, concurrently, the first conductor is coupled to the fifth conductor. For example, at stage 1330 the controller 650 may send the control signal 654 to the switch 670 to cause the switch 670 to couple the RF circuitry 660 to the second conductor 622 such that the RF circuitry 660 is coupled to the second conductor 622 while the first conductor 612 is coupled to the first-panel conductor 614, e.g., as shown in FIG. 7. In a still further example implementation, coupling the first conductor to the fifth conductor comprises selectively coupling the first conductor to the fifth conductor via one of a plurality of reactances. For example, the control signal 656 may cause the switch 680 to couple the first conductor 612 to the first-panel conductor 614 via a selected reactance such as an inductance of one of the inductors 921-923.

Also or alternatively, implementations of the method 1500 may include one or more of the following features. In an example implementation, the fourth conductor is disposed in the first panel proximate to, but separate from, the first conductor, and wherein the method 1500 further includes: providing RF circuitry (radio frequency circuitry) that is coupled to the second conductor and configured to at least one of: receive and process a first RF signal from the signal transducer; and provide a second RF signal to the signal transducer; and selectively coupling the first conductor to the fourth conductor to have the signal transducer comprise the first conductor, the second conductor, the third conductor, and the fourth conductor. For example, the first-panel conductor 614 is the fourth conductor, and the controller 650 may send the control signal 654 to cause the switch 670 to couple the RF circuitry 660 to the second conductor 622 and send the control signal 656 to the switch 680 to cause the switch 680 to couple the first conductor 612 to the first-panel conductor 614 such that the conductors 612, 614, 622, 632 form a signal transducer. The controller 650, the switch 680, the first conductor 612, and the first-panel conductor 614 may comprise means for selectively coupling the first conductor to the fourth conductor. In a further example implementation, selectively coupling the first conductor to the fourth conductor comprises selectively coupling the first conductor to the fourth conductor via one of a plurality of reactances. For example, the control signal 656 may cause the switch 680 to couple the first conductor 612 to the first-panel conductor 614 via a selected reactance such as an inductance of one of the inductors 921-923. In another further example implementation, selectively coupling the first conductor to the fourth conductor comprises coupling the first conductor to the fourth conductor for a standalone mode of the foldable UE. For example, the controller 650 may send the control signal 654 to cause the switch 670 to couple the RF circuit 660 to the second conductor 622 and send the control signal 656 to cause the switch 680 to couple the first conductor 612 to the first-panel conductor 614 based on a desire to operate in SA mode. In another example implementation, each at least one of the first conductor, the second conductor, or the fourth conductor comprises a respective portion of a frame of the foldable UE. For example, the first conductor 612 may comprise a portion of a frame of the foldable UE 600, the second conductor 622 may comprise a portion of a frame of the foldable UE 600, the first-panel conductor 614 may comprise a portion of a frame of the foldable UE 600, and/or the second-panel conductor 624 may comprise a portion of a frame of the foldable UE 600.

Referring to FIG. 16, with further reference to FIGS. 5-13, a method 1600 of configuring a signal transducer of a foldable UE includes the stages shown. The method 1600 is, however, an example and not limiting. The method 1600 may be altered, e.g., by having one or more stages added, removed, rearranged, combined, performed concurrently, and/or having one or more single stages split into multiple stages.

At stage 1610, the method 1600 includes selectively coupling a first-panel conductor, of a first panel of the foldable UE, to a first conductor of the first panel. For example, the controller 650 may cause the switch 680 to selectively couple the first-panel conductor 614 to the first conductor 612 or to uncouple the first-panel conductor 614 to the first conductor 612.

At stage 1620, the method 1600 includes selectively coupling a radio frequency circuit of a second panel of the foldable UE to either a second-panel conductor of the second panel or to a second conductor of the second panel, at least one of the first panel and the second panel comprising a respective portion of a display, wherein: the first conductor is electrically coupled to the second conductor by a third conductor of a hinge that is connected to the first panel and the second panel and that is configured to allow the first panel to rotate relative to the second panel about a pivot axis of the hinge; the first-panel conductor, the first conductor, the second conductor, and the third conductor form the signal transducer with the first-panel conductor selectively coupled to the first conductor and the radio frequency circuit selectively coupled to the second conductor; and the first conductor, the second conductor, the third conductor, and the second-panel conductor form the signal transducer with the first-panel conductor selectively uncoupled from the first conductor and the radio frequency circuit selectively coupled to the second-panel conductor. For example, the controller 650 may actuate the switches 680, 670 such that the first-panel conductor 614 is coupled to the first conductor 612 and concurrently the RF circuitry 660 is coupled to the second conductor 622. As another example, the controller 650 may actuate the switches 680, 670 such that the first-panel conductor 614 is uncoupled from the first conductor 612 and concurrently the RF circuitry 660 is coupled to the second-panel conductor 624.

In an example implementation of the method 1600, selectively coupling the first-panel conductor to the first conductor comprises selectively coupling the first-panel conductor to the first conductor via one of a plurality of reactances. For example, the controller 650 may cause the switch 900 to couple the first-panel conductor 614 via one of the inductors 921-923 to the first conductor 612.

IMPLEMENTATION EXAMPLES

Implementation examples are provided in the following numbered clauses.

Clause 1. A foldable UE (user equipment) comprising:

a first panel comprising a first conductor configured to provide a first portion of a signal transducer that is configured to transduce between guided signals and wireless signals;

a second panel comprising a second conductor configured to provide a second portion of the signal transducer, at least one of the first panel and the second panel further comprising a respective portion of a display;

a hinge connected to the first panel and the second panel and configured to allow the first panel to rotate relative to the second panel about a pivot axis of the hinge, the hinge comprising a third conductor configured to provide a third portion of the signal transducer, the third conductor electrically coupling the first conductor to the second conductor;

a fourth conductor that is physically separate from the first conductor, the second conductor, and the third conductor; and a selection mechanism configured to selectively cause the fourth conductor to provide a fourth portion of the signal transducer.

Clause 2. The foldable UE of clause 1, further comprising RF circuitry (radio frequency circuitry) configured to at least one of:

receive and process a first RF signal from the signal transducer; and provide a second RF signal to the signal transducer;

wherein the fourth conductor is disposed in the second panel proximate to, but separate from, the second conductor; and wherein the selection mechanism is configured to selectively couple the RF circuitry to the fourth conductor to have the signal transducer comprise the first conductor, the second conductor, the third conductor, and the fourth conductor.

Clause 3. The foldable UE of clause 1 or clause 2, further comprising a controller communicatively coupled to the selection mechanism and configured to cause the selection mechanism to couple the RF circuitry to the fourth conductor for a non-standalone mode of the foldable UE.

Clause 4. The foldable UE of any of clauses 1-3, wherein the selection mechanism is a second selection mechanism and wherein the first panel further comprises:

a fifth conductor separate from the first conductor; and a first selection mechanism configured to selectively couple the fifth conductor to the first conductor.

Clause 5. The foldable UE of clause 4, further comprising a controller communicatively coupled to the first selection mechanism and the second selection mechanism and configured to cause, for a standalone mode of the foldable UE, the second selection mechanism to couple the RF circuitry to the second conductor and, concurrently, the first selection mechanism to couple the first conductor to the fifth conductor.

Clause 6. The foldable UE of clause 4 or clause 5, wherein the first selection mechanism is configured to selectively couple the first conductor to the fifth conductor via one of a plurality of reactances.

Clause 7. The foldable UE of clause 1, further comprising RF circuitry (radio frequency circuitry) configured to at least one of:

receive and process a first RF signal from the signal transducer; and provide a second RF signal to the signal transducer;

wherein the fourth conductor is disposed in the first panel proximate to, but separate from, the first conductor;

wherein the RF circuitry is coupled to the second conductor; and wherein the selection mechanism is configured to selectively couple the first conductor to the fourth conductor to have the signal transducer comprise the first conductor, the second conductor, the third conductor, and the fourth conductor.

Clause 8. The foldable UE of clause 1 or clause 7, wherein the selection mechanism is configured to selectively couple the first conductor to the fourth conductor via one of a plurality of reactances.

Clause 9. The foldable UE of clause 1 or clause 7, wherein the selection mechanism is configured to selectively couple the first conductor to the fourth conductor for a standalone mode of the foldable UE.

Clause 10. The foldable UE of clause 1, wherein the hinge comprises a first electrically-conductive flange and a second electrically-conductive flange, and wherein the first electrically-conductive flange is electrically separated from a first ground conductor of the first panel and the second electrically-conductive flange is electrically separated from a second ground conductor of the second panel.

Clause 11. The foldable UE of clause 1, wherein the hinge comprises a first electrically-conductive flange and a second electrically-conductive flange, and wherein the first electrically-conductive flange defines a first slot extending from a first perimeter of the first electrically-conductive flange and the second electrically-conductive flange defines a second slot extending from a second perimeter of the second electrically-conductive flange.

Clause 12. The foldable UE of clause 11, wherein the first electrically-conductive flange is electrically coupled to a first ground conductor of the first panel and the second electrically-conductive flange is electrically coupled to a second ground conductor of the second panel.

Clause 13. The foldable UE of clauses 1-12, wherein each at least one of the first conductor, the second conductor, or the fourth conductor comprises a respective portion of a frame of the foldable UE.

Clause 14. A method of configuring a signal transducer of a foldable UE (user equipment), the method comprising:

providing a first panel comprising a first conductor configured to provide a first portion of the signal transducer, the signal transducer being configured to transduce between guided signals and wireless signals;

providing a second panel comprising a second conductor configured to provide a second portion of the signal transducer, at least one of the first panel and the second panel further comprising a respective portion of a display;

providing a hinge connected to the first panel and the second panel and configured to allow the first panel to rotate relative to the second panel about a pivot axis of the hinge, the hinge comprising a third conductor configured to provide a third portion of the signal transducer, the third conductor electrically coupling the first conductor to the second conductor;

providing a fourth conductor that is physically separate from the first conductor, the second conductor, and the third conductor; and selectively causing the fourth conductor to provide a fourth portion of the signal transducer.

Clause 15. The method of clause 14, wherein:

the fourth conductor is disposed in the second panel proximate to, but separate from, the second conductor;

the method further comprises providing RF circuitry (radio frequency circuitry) configured to at least one of: receive and process a first RF signal from the signal transducer; and provide a second RF signal to the signal transducer; and selectively causing the fourth conductor to provide the fourth portion of the signal transducer comprises selectively coupling the RF circuitry to the fourth conductor to have the signal transducer comprise the first conductor, the second conductor, the third conductor, and the fourth conductor.

Clause 16. The method of clause 15, wherein selectively coupling the RF circuitry to the fourth conductor comprises selectively coupling the RF circuitry to the fourth conductor for a non-standalone mode of the foldable UE.

Clause 17. The method of any of clauses 13-15, wherein the first panel further comprises a fifth conductor separate from and proximate to the first conductor, and wherein the method further comprises selectively coupling the fifth conductor to the first conductor.

Clause 18. The method of clause 17, wherein, for a standalone mode of the foldable UE, the RF circuitry is coupled to the second conductor and, concurrently, the first conductor is coupled to the fifth conductor.

Clause 19. The method of clause 17 or clause 18, wherein coupling the first conductor to the fifth conductor comprises selectively coupling the first conductor to the fifth conductor via one of a plurality of reactances.

Clause 20. The method of clause 14, wherein the fourth conductor is disposed in the first panel proximate to, but separate from, the first conductor, and wherein the method further comprises:

providing RF circuitry (radio frequency circuitry) that is coupled to the second conductor and configured to at least one of: receive and process a first RF signal from the signal transducer; and provide a second RF signal to the signal transducer; and selectively coupling the first conductor to the fourth conductor to have the signal transducer comprise the first conductor, the second conductor, the third conductor, and the fourth conductor.

Clause 21. The method of clause 20, wherein selectively coupling the first conductor to the fourth conductor comprises selectively coupling the first conductor to the fourth conductor via one of a plurality of reactances.

Clause 22. The method of clause 20, wherein selectively coupling the first conductor to the fourth conductor comprises coupling the first conductor to the fourth conductor for a standalone mode of the foldable UE.

Clause 23. A foldable UE (user equipment) comprising:

a first panel comprising a first conductor configured to provide a first portion of a signal transducer that is configured to transduce between guided signals and wireless signals;

a second panel comprising a second conductor configured to provide a second portion of the signal transducer, at least one of the first panel and the second panel further comprising a respective portion of a display;

a hinge connected to the first panel and the second panel and configured to allow the first panel to rotate relative to the second panel about a pivot axis of the hinge, the hinge comprising a third conductor configured to provide a third portion of the signal transducer, the third conductor electrically coupling the first conductor to the second conductor;

a fourth conductor that is physically separate from the first conductor, the second conductor, and the third conductor; and means for selectively causing the fourth conductor to provide a fourth portion of the signal transducer.

Clause 24. The foldable UE of clause 23, wherein:

the fourth conductor is disposed in the second panel proximate to, but separate from, the second conductor;

the foldable UE further comprises RF circuitry (radio frequency circuitry) configured to at least one of: receive and process a first RF signal from the signal transducer; and provide a second RF signal to the signal transducer; and the means for selectively causing the fourth conductor to provide the fourth portion of the signal transducer comprises means for selectively coupling the RF circuitry to the fourth conductor to have the signal transducer comprise the first conductor, the second conductor, the third conductor, and the fourth conductor.

Clause 25. The foldable UE of clause 24, wherein the means for selectively coupling the RF circuitry to the fourth conductor comprise means for selectively coupling the RF circuitry to the fourth conductor for a non-standalone mode of the foldable UE.

Clause 26. The foldable UE of any of clauses 22-24, wherein the first panel further comprises a fifth conductor separate from and proximate to the first conductor, and wherein the foldable UE further comprises means for selectively coupling the fifth conductor to the first conductor.

Clause 27. The foldable UE of clause 26, wherein the means for selectively coupling the RF circuitry to the fourth conductor and the means for selectively coupling the fifth conductor the first conductor are for concurrently coupling, for a standalone mode of the foldable UE, the first conductor to the fifth conductor and the RF circuitry to the second conductor.

Clause 28. The foldable UE of clause 26 or clause 27, wherein coupling the first conductor to the fifth conductor comprises selectively coupling the first conductor to the fifth conductor via one of a plurality of reactances.

Clause 29. The foldable UE of clause 23, wherein the fourth conductor is disposed in the first panel proximate to, but separate from, the first conductor, and wherein the foldable UE further comprises:

RF circuitry (radio frequency circuitry) that is coupled to the first conductor and configured to at least one of: receive and process a first RF signal from the signal transducer; and provide a second RF signal to the signal transducer; and means for selectively coupling the first conductor to the fourth conductor to have the signal transducer comprise the first conductor, the second conductor, the third conductor, and the fourth conductor.

Clause 30. The foldable UE of clause 29, wherein the means for selectively coupling the first conductor to the fourth conductor comprise means for selectively coupling the first conductor to the fourth conductor via one of a plurality of reactances.

Clause 31. The foldable UE of clause 29, wherein the means for selectively coupling the first conductor to the fourth conductor comprise means for coupling the first conductor to the fourth conductor for a standalone mode of the foldable UE.

Clause 32. A method of configuring a signal transducer of a foldable UE (user equipment), the method comprising:

selectively coupling a first-panel conductor, of a first panel of the foldable UE, to a first conductor of the first panel; and selectively coupling a radio frequency circuit of a second panel of the foldable UE to either a second-panel conductor of the second panel or to a second conductor of the second panel, at least one of the first panel and the second panel comprising a respective portion of a display;

wherein the first conductor is electrically coupled to the second conductor by a third conductor of a hinge that is connected to the first panel and the second panel and that is configured to allow the first panel to rotate relative to the second panel about a pivot axis of the hinge;

wherein the first-panel conductor, the first conductor, the second conductor, and the third conductor form the signal transducer with the first-panel conductor selectively coupled to the first conductor and the radio frequency circuit selectively coupled to the second conductor; and wherein the first conductor, the second conductor, the third conductor, and the second-panel conductor form the signal transducer with the first-panel conductor selectively uncoupled from the first conductor and the radio frequency circuit selectively coupled to the second-panel conductor.

Clause 33. The method of clause 32, wherein selectively coupling the first-panel conductor to the first conductor comprises selectively coupling the first-panel conductor to the first conductor via one of a plurality of reactances.

OTHER CONSIDERATIONS

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. Thus, reference to a device in the singular (e.g., "a device," "the device"), including in the claims, includes at least one, i.e., one or more, of such devices (e.g., "a processor" includes at least one processor (e.g., one processor, two processors, etc.), "the processor" includes at least one processor, "a memory" includes at least one memory, "the memory" includes at least one memory, etc.). The phrases "at least one" and "one or more" are used interchangeably and such that "at least one" referred-to object and "one or more" referred-to objects include implementations that have one referred-to object and implementations that have multiple referred-to objects. For example, "at least one processor" and "one or more processors" each includes implementations that have one processor and implementations that have multiple processors.

The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

As used herein, unless otherwise stated, a statement that a function or operation is "based on" an item or condition means that the function or operation is based on the stated item or condition and may be based on one or more items and/or conditions in addition to the stated item or condition.

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection, between wireless communication devices. A wireless communication system (also called a wireless communications system, a wireless communication network, or a wireless communications network) may not have all communications transmitted wirelessly, but is configured to have at least some communications transmitted wirelessly. Further, the term "wireless communication device," or similar term, does not require that the functionality of the device is exclusively, or even primarily, for communication, or that communication using the wireless communication device is exclusively, or even primarily, wireless, or that the device be a mobile device, but indicates that the device includes wireless communication capability (one-way or two-way), e.g., includes at least one radio (each radio being part of a transmitter, receiver, or transceiver) for wireless communication.

Specific details are given in the description herein to provide a thorough understanding of example configurations (including implementations). However, configurations may be practiced without these specific details. For example, well-known circuits, processes, algorithms, structures, and techniques have been shown without unnecessary detail in order to avoid obscuring the configurations. The description herein provides example configurations, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

Unless otherwise indicated, "about" and/or "approximately" as used herein when referring to a measurable value such as an amount, a temporal duration, and the like, encompasses variations of +20% or +10%, +5%, or +0.1% from the specified value, as appropriate in the context of the systems, devices, circuits, methods, and other implementations described herein. Unless otherwise indicated, "substantially" as used herein when referring to a measurable value such as an amount, a temporal duration, a physical attribute (such as frequency), and the like, also encompasses variations of ±20% or ±10%, ±5%, or ±0.1% from the specified value, as appropriate in the context of the systems, devices, circuits, methods, and other implementations described herein.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A foldable UE (user equipment) comprising:
   a first panel comprising a first conductor configured to provide a first portion of a signal transducer that is configured to transduce between guided signals and wireless signals;
   a second panel comprising a second conductor configured to provide a second portion of the signal transducer, at least one of the first panel and the second panel further comprising a respective portion of a display;
   a hinge connected to the first panel and the second panel and configured to allow the first panel to rotate relative to the second panel about a pivot axis of the hinge, the hinge comprising a third conductor configured to provide a third portion of the signal transducer, the third conductor electrically coupling the first conductor to the second conductor;
   a fourth conductor that is physically separate from the first conductor, the second conductor, and the third conductor; and
   a selection mechanism configured to selectively cause the fourth conductor to provide a fourth portion of the signal transducer.

2. The foldable UE of claim 1, further comprising RF circuitry (radio frequency circuitry) configured to at least one of:
   receive and process a first RF signal from the signal transducer; and
   provide a second RF signal to the signal transducer;
   wherein the fourth conductor is disposed in the second panel proximate to, but separate from, the second conductor; and
   wherein the selection mechanism is configured to selectively couple the RF circuitry to the fourth conductor to have the signal transducer comprise the first conductor, the second conductor, the third conductor, and the fourth conductor.

3. The foldable UE of claim 2, further comprising a controller communicatively coupled to the selection mechanism and configured to cause the selection mechanism to couple the RF circuitry to the fourth conductor for a non-standalone mode of the foldable UE.

4. The foldable UE of claim 2, wherein the selection mechanism is a second selection mechanism and wherein the first panel further comprises:
   a fifth conductor separate from the first conductor; and
   a first selection mechanism configured to selectively couple the fifth conductor to the first conductor.

5. The foldable UE of claim 4, further comprising a controller communicatively coupled to the first selection mechanism and the second selection mechanism and configured to cause, for a standalone mode of the foldable UE, the second selection mechanism to couple the RF circuitry to the second conductor and, concurrently, the first selection mechanism to couple the first conductor to the fifth conductor.

6. The foldable UE of claim 4, wherein the first selection mechanism is configured to selectively couple the first conductor to the fifth conductor via one of a plurality of reactances.

7. The foldable UE of claim 1, further comprising RF circuitry (radio frequency circuitry) configured to at least one of:

receive and process a first RF signal from the signal transducer; and provide a second RF signal to the signal transducer;

wherein the fourth conductor is disposed in the first panel proximate to, but separate from, the first conductor;

wherein the RF circuitry is coupled to the second conductor; and wherein the selection mechanism is configured to selectively couple the first conductor to the fourth conductor to have the signal transducer comprise the first conductor, the second conductor, the third conductor, and the fourth conductor.

8. The foldable UE of claim 7, wherein the selection mechanism is configured to selectively couple the first conductor to the fourth conductor via one of a plurality of reactances.

9. The foldable UE of claim 7, wherein the selection mechanism is configured to selectively couple the first conductor to the fourth conductor for a standalone mode of the foldable UE.

10. The foldable UE of claim 1, wherein the hinge comprises a first electrically-conductive flange and a second electrically-conductive flange, and wherein the first electrically-conductive flange is electrically separated from a first ground conductor of the first panel and the second electrically-conductive flange is electrically separated from a second ground conductor of the second panel.

11. The foldable UE of claim 1, wherein the hinge comprises a first electrically-conductive flange and a second electrically-conductive flange, and wherein the first electrically-conductive flange defines a first slot extending from a first perimeter of the first electrically-conductive flange and the second electrically-conductive flange defines a second slot extending from a second perimeter of the second electrically-conductive flange.

12. The foldable UE of claim 11, wherein the first electrically-conductive flange is electrically coupled to a first ground conductor of the first panel and the second electrically-conductive flange is electrically coupled to a second ground conductor of the second panel.

13. The foldable UE of claim 1, wherein each at least one of the first conductor, the second conductor, or the fourth conductor comprises a respective portion of a frame of the foldable UE.

14. A method of configuring a signal transducer of a foldable UE (user equipment), the method comprising:

providing a first panel comprising a first conductor configured to provide a first portion of the signal transducer, the signal transducer being configured to transduce between guided signals and wireless signals;

providing a second panel comprising a second conductor configured to provide a second portion of the signal transducer, at least one of the first panel and the second panel further comprising a respective portion of a display;

providing a hinge connected to the first panel and the second panel and configured to allow the first panel to rotate relative to the second panel about a pivot axis of the hinge, the hinge comprising a third conductor configured to provide a third portion of the signal transducer, the third conductor electrically coupling the first conductor to the second conductor;

providing a fourth conductor that is physically separate from the first conductor, the second conductor, and the third conductor; and selectively causing the fourth conductor to provide a fourth portion of the signal transducer.

15. The method of claim 14, wherein:

the fourth conductor is disposed in the second panel proximate to, but separate from, the second conductor;

the method further comprises providing RF circuitry (radio frequency circuitry) configured to at least one of: receive and process a first RF signal from the signal transducer; and provide a second RF signal to the signal transducer; and selectively causing the fourth conductor to provide the fourth portion of the signal transducer comprises selectively coupling the RF circuitry to the fourth conductor to have the signal transducer comprise the first conductor, the second conductor, the third conductor, and the fourth conductor.

16. The method of claim 15, wherein selectively coupling the RF circuitry to the fourth conductor comprises selectively coupling the RF circuitry to the fourth conductor for a non-standalone mode of the foldable UE.

17. The method of claim 15, wherein the first panel further comprises a fifth conductor separate from and proximate to the first conductor, and wherein the method further comprises selectively coupling the fifth conductor to the first conductor.

18. The method of claim 17, wherein, for a standalone mode of the foldable UE, the RF circuitry is coupled to the second conductor and, concurrently, the first conductor is coupled to the fifth conductor.

19. The method of claim 17, wherein coupling the first conductor to the fifth conductor comprises selectively coupling the first conductor to the fifth conductor via one of a plurality of reactances.

20. The method of claim 14, wherein the fourth conductor is disposed in the first panel proximate to, but separate from, the first conductor, and wherein the method further comprises:

providing RF circuitry (radio frequency circuitry) that is coupled to the second conductor and configured to at least one of: receive and process a first RF signal from the signal transducer; and provide a second RF signal to the signal transducer; and selectively coupling the first conductor to the fourth conductor to have the signal transducer comprise the first conductor, the second conductor, the third conductor, and the fourth conductor.

21. The method of claim 20, wherein selectively coupling the first conductor to the fourth conductor comprises selectively coupling the first conductor to the fourth conductor via one of a plurality of reactances.

22. The method of claim 20, wherein selectively coupling the first conductor to the fourth conductor comprises coupling the first conductor to the fourth conductor for a standalone mode of the foldable UE.

23. A foldable UE (user equipment) comprising:

a first panel comprising a first conductor configured to provide a first portion of a signal transducer that is configured to transduce between guided signals and wireless signals;

a second panel comprising a second conductor configured to provide a second portion of the signal transducer, at least one of the first panel and the second panel further comprising a respective portion of a display;

a hinge connected to the first panel and the second panel and configured to allow the first panel to rotate relative to the second panel about a pivot axis of the hinge, the hinge comprising a third conductor configured to provide a third portion of the signal transducer, the third conductor electrically coupling the first conductor to the second conductor;

a fourth conductor that is physically separate from the first conductor, the second conductor, and the third conductor; and means for selectively causing the fourth conductor to provide a fourth portion of the signal transducer.

24. The foldable UE of claim 23, wherein:

the fourth conductor is disposed in the second panel proximate to, but separate from, the second conductor;

the foldable UE further comprises RF circuitry (radio frequency circuitry) configured to at least one of: receive and process a first RF signal from the signal transducer; and provide a second RF signal to the signal transducer; and the means for selectively causing the fourth conductor to provide the fourth portion of the signal transducer comprises means for selectively coupling the RF circuitry to the fourth conductor to have the signal transducer comprise the first conductor, the second conductor, the third conductor, and the fourth conductor.

25. The foldable UE of claim 24, wherein the means for selectively coupling the RF circuitry to the fourth conductor comprise means for selectively coupling the RF circuitry to the fourth conductor for a non-standalone mode of the foldable UE.

26. The foldable UE of claim 24, wherein the first panel further comprises a fifth conductor separate from and proximate to the first conductor, and wherein the foldable UE further comprises means for selectively coupling the fifth conductor to the first conductor.

27. The foldable UE of claim 26, wherein the means for selectively coupling the RF circuitry to the fourth conductor and the means for selectively coupling the fifth conductor the first conductor are for concurrently coupling, for a standalone mode of the foldable UE, the first conductor to the fifth conductor and the RF circuitry to the second conductor.

28. The foldable UE of claim 26, wherein coupling the first conductor to the fifth conductor comprises selectively coupling the first conductor to the fifth conductor via one of a plurality of reactances.

29. A method of configuring a signal transducer of a foldable UE (user equipment), the method comprising:

selectively coupling a first-panel conductor, of a first panel of the foldable UE, to a first conductor of the first panel; and selectively coupling a radio frequency circuit of a second panel of the foldable UE to either a second-panel conductor of the second panel or to a second conductor of the second panel, at least one of the first panel and the second panel comprising a respective portion of a display;

wherein the first conductor is electrically coupled to the second conductor by a third conductor of a hinge that is connected to the first panel and the second panel and that is configured to allow the first panel to rotate relative to the second panel about a pivot axis of the hinge;

wherein the first-panel conductor, the first conductor, the second conductor, and the third conductor form the signal transducer with the first-panel conductor selectively coupled to the first conductor and the radio frequency circuit selectively coupled to the second conductor; and wherein the first conductor, the second conductor, the third conductor, and the second-panel conductor form the signal transducer with the first-panel conductor selectively uncoupled from the first conductor and the radio frequency circuit selectively coupled to the second-panel conductor.

30. The method of claim 29, wherein selectively coupling the first-panel conductor to the first conductor comprises selectively coupling the first-panel conductor to the first conductor via one of a plurality of reactances.

\* \* \* \* \*